(12) United States Patent
Lee

(10) Patent No.: US 7,895,780 B2
(45) Date of Patent: Mar. 1, 2011

(54) APPARATUS CAPABLE OF DISPLAYING DYNAMIC IMAGES

(76) Inventor: Carson Kar-Sein Lee, Pomona, CA (US)

(*) Notice: Subject to any disclaimer, the term of this patent is extended or adjusted under 35 U.S.C. 154(b) by 572 days.

(21) Appl. No.: 12/000,146

(22) Filed: Dec. 10, 2007

(65) Prior Publication Data

US 2009/0147357 A1 Jun. 11, 2009

(51) Int. Cl.
*G09F 19/14* (2006.01)
(52) U.S. Cl. .............................. 40/454; 40/310
(58) Field of Classification Search ........... 40/545
See application file for complete search history.

(56) References Cited

U.S. PATENT DOCUMENTS

| 5,494,445 | A | 2/1996 | Sekiguchi et al. | |
|---|---|---|---|---|
| 6,226,906 | B1* | 5/2001 | Bar-Yona | 40/454 |
| 6,357,153 | B1* | 3/2002 | Gelardi et al. | 40/454 |
| 6,974,080 | B1 | 12/2005 | Goggins | |
| 2004/0139635 | A1* | 7/2004 | McKinley | 40/454 |
| 2006/0042136 | A1* | 3/2006 | Chan | 40/454 |

* cited by examiner

*Primary Examiner* — Cassandra Davis
(74) *Attorney, Agent, or Firm* — Birch, Stewart, Kolasch & Birch, LLP

(57) ABSTRACT

An apparatus comprises a substrate, a striped pattern and a lenticular sheet. The substrate has a flat surface to which the striped pattern is applied. The lenticular sheet is arranged to be parallelly movable with respect to the striped pattern which is on the flat surface of the substrate. The lenticular sheet has a front surface including a plurality of lenticules oriented along an axial direction and a back surface facing and spaced apart from the striped pattern.

9 Claims, 11 Drawing Sheets

APPARATUS CAPABLE OF DISPLAYING DYNAMIC IMAGES

BACKGROUND OF INVENTION

1. Field of Invention

This invention is directed to an apparatus capable of displaying dynamic, continuous images via lenticular lens. In particular, the invention is related to a dispenser having a flat surface which is able to display the dynamic, continuous images.

2. Related Prior Art

Lenticular lenses are found to be an effective way to create multidimensional effects from two-dimensional printed images. Lenticular lenses take the form of a transparent plastic sheet or web, and the sheet typically includes an array of identical curved or ribbed surfaces that are formed on the front surface of the plastic sheet. The back surface of the lens is typically flat. Each lenticule or individual lens is typically a section of a long cylinder that focuses on, and extends over, substantially the full length of an underlying image. Other lens shapes or profiles are possible (for instance, pyramidal, trapezoidal, parabolic, and the like). The lenticular lens is generally selected to accommodate both the underlying image and the distance from which the image will ordinarily be viewed.

As disclosed in U.S. Pat. Nos. 5,494,445 and 6,974,080, a lenticular image or a display comprises an underlying precursor image that has been applied to a lenticular lens. The precursor image is a composite of two or more component images based upon the desired features of the lenticular or final image. The component images are then arranged and/or segmented to create the precursor image so that the precursor image corresponds with the lenticular lens. Preferably, the image is printed directly to the flat back surface of the lenticular sheet or film. In other words, the image is fixed on the lenticular sheet. Though the lenticular image or the display therefore creates multidimensional effects, each lenticule or individual lens is limited to display a section of the underlying image that is right stuck on the back surface of the lenticule. Further, the viewer may need to change view angles so as to watch the lenticular illusion effect.

SUMMARY OF INVENTION

An apparatus with lenticular lens is provided here that solves the aforementioned problems, and can display another type of visual illusion which is more vivid than those using a conventional lenticular imaging technology.

In the preferred embodiment, disclosed herein is the apparatus which comprises a substrate, a striped pattern and a lenticular sheet. The substrate has a flat surface to which the striped pattern is applied. The lenticular sheet is arranged to be parallelly movable with respect to the striped pattern. The lenticular sheet has a front surface including a plurality of lenticules oriented along an axial direction and a back surface facing and spaced apart from the striped pattern. In such a fashion, when the lenticular sheet or the striped pattern is moved with respect to each other, each lenticule is not limited to display a little piece of the striped pattern but display every piece of the striped pattern wherever it moves or scans, so that a dynamic continuous 3D image is performed as a whole via all of the lenticules, namely the lenticular sheet. Further, a viewer can enjoy watching the dynamic continuous 3D image in a constant view angle.

Preferably, the substrate of the apparatus can be can be used to form or make, for example, a container substrate, a package substrate or the like. Hence each such substrate can be used to form or make the apparatus as a dispenser, a package or other product, respectively.

Other features, objects, aspects and advantages will be identified and described in detail below.

DETAILED DESCRIPTION OF EMBODIMENTS

Described here is an inventive apparatus capable of displaying dynamic continuous image using a lenticular sheet. One of skill in the art will understand that the apparatus described can have other uses and that appropriate modifications can be made.

With reference to FIGS. 1 to 7, description will be given of an apparatus in a form of a dispenser according to a first embodiment of this invention.

Figure 1:
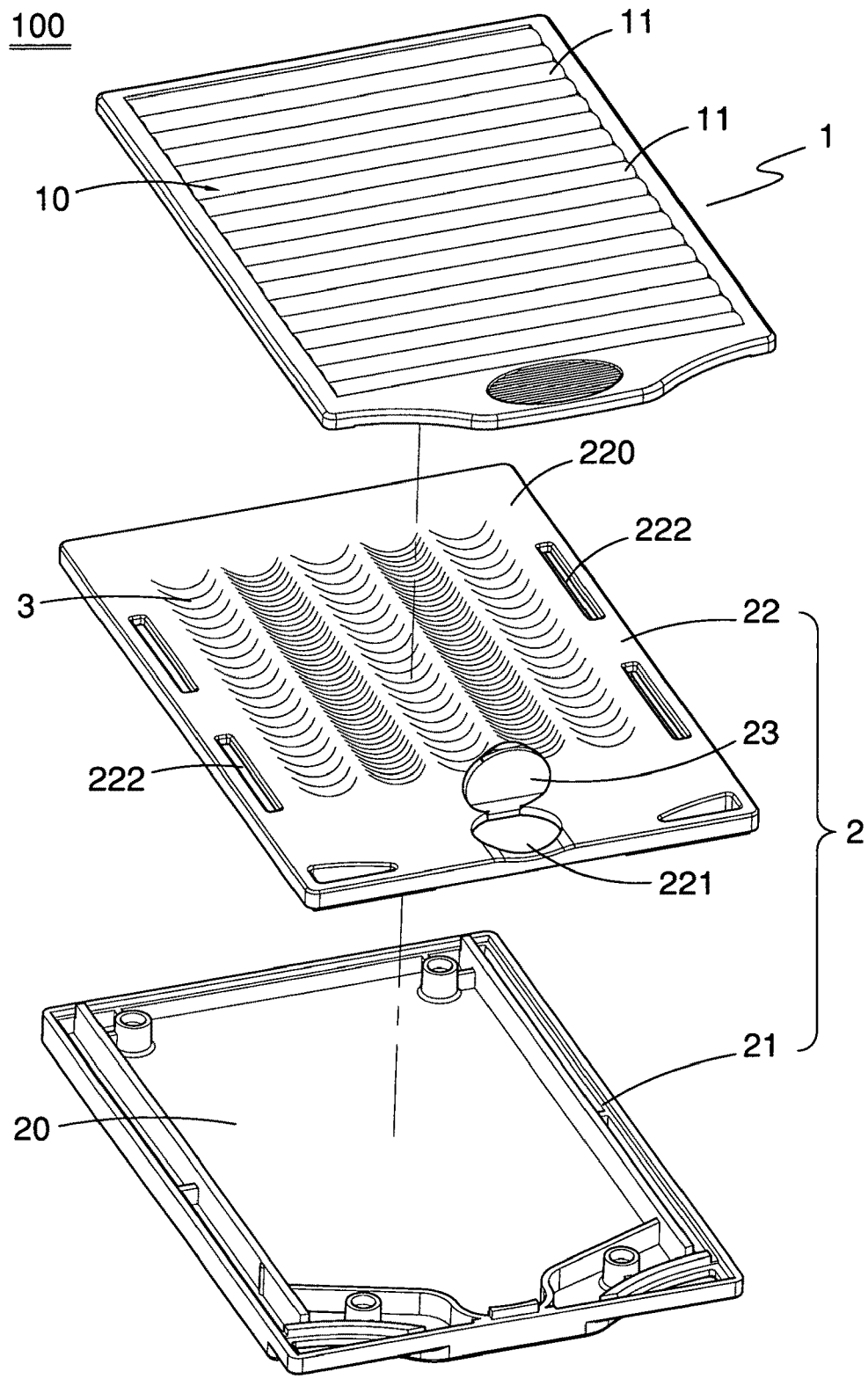
FIG. 1 is an exploded view of an apparatus assembled in a form of a dispenser according to one embodiment of the present invention.

Referring to FIG. 1, an exploded view of the dispenser 100 is shown, comprising a lenticular sheet 1, a substrate 2 and a striped pattern 3. The substrate 2 comprises a shell 21 and a plate 22 mounted on an open top of the shell 21. The striped pattern 3 is applied to the plate 22 of the substrate 2.

Figure 4:
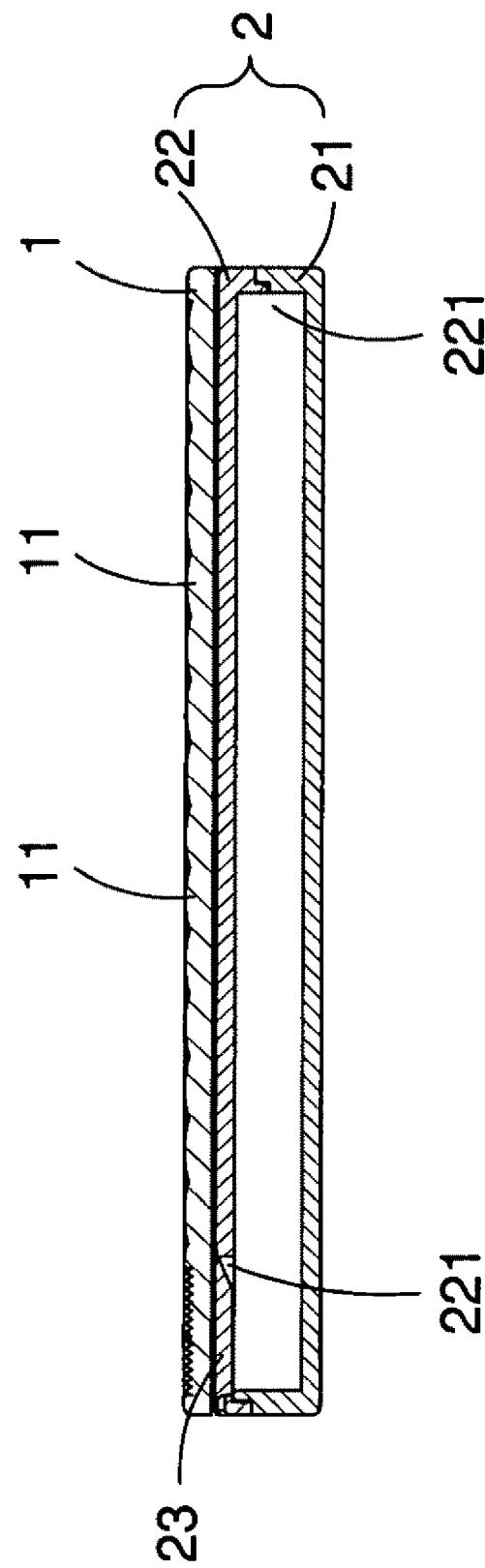
FIG. 4 is a cross-sectional view of the dispenser taken along line A-A in FIG. 3.

Referring to FIGS. 1 and 4, the substrate 2 includes a cavity 20 co-defined by the shell 21 and the plate 22 for storing contents (not shown), such as candies or pills. The plate 22 of the substrate 2 has a top flat surface 220 where the striped pattern 3 is applied. The plate 22 defines an opening 221 in a front end of the flat surface 220, and at least two parallel slots 222 in two opposite sides of the flat surface 220. The opening 221 is in communication with the cavity 20 so that the contents can be taken out from the cavity 20 through the opening 221. The substrate 2 further comprises a stopper 23 formed in a shape of the opening 221 to be received in the opening 221. As best seen in FIG. 1, the stopper 23 has an end movably secured on a wall of the opening 221 so that the stopper 231 can be used to tightly block the opening 221 to preserve the contents from oxidation, and be opened to dispense the same.

Figure 2:
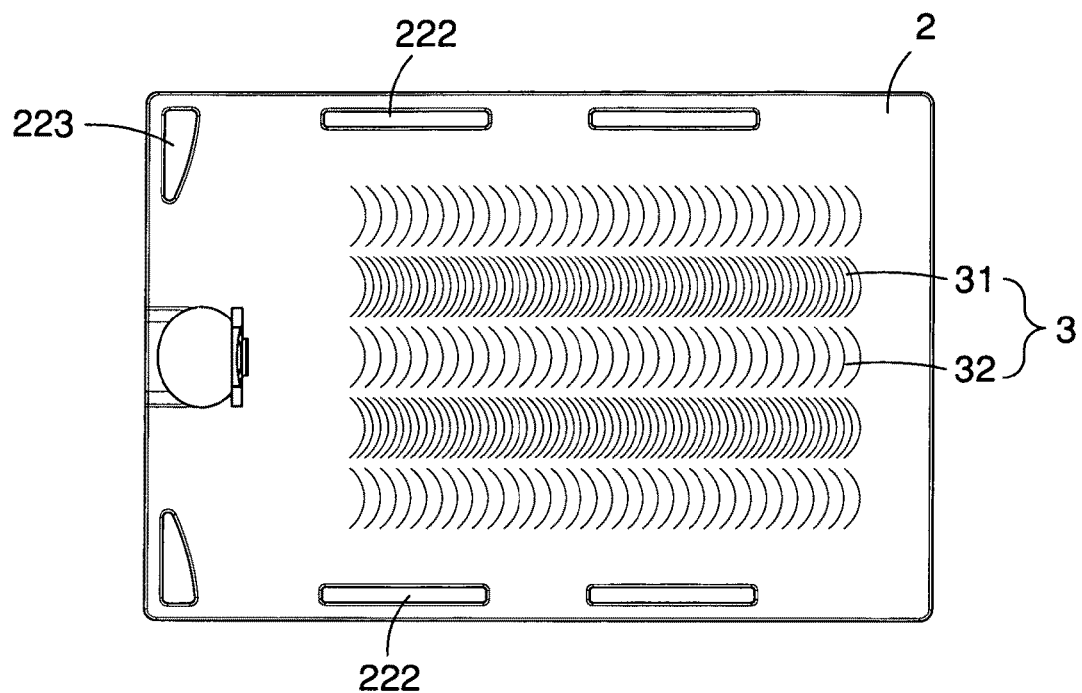
FIG. 2 is a top view of the dispenser of FIG. 1 except the lenticular sheet, showing that the striped pattern is exposed.
Figure 3:
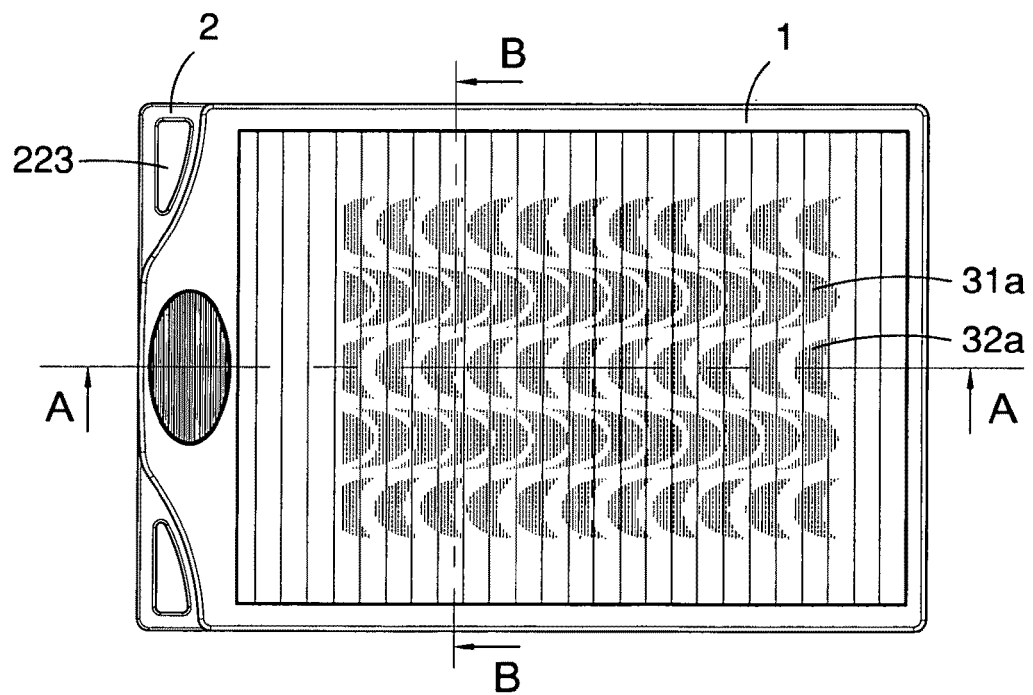
FIG. 3 is a top view of the dispenser of FIG. 1, showing the striped pattern is covered with the lenticular sheet.

Referring to FIGS. 2 or 3, the substrate 2 further defines at least one hole 223 at a corner for key rings.

The lenticular sheet 1 has a ribbed front surface 10 including a plurality of lenticules 11 or lenses oriented along an axial direction and a flat back surface opposite to the front surface 10. Other lens shapes or profiles are possible (for instance, pyramidal, trapezoidal, parabolic, and the like). It is important to note that the thicknesses of lenticules 11 as well as the pitch of lenticules 11 are exaggerated (as in FIG. 1 and others) to facilitate representation. The striped pattern 3 that can impart an illusion of motion to a viewer viewing the striped pattern 3 through the lenticular sheet 1 is not joined directly to the back surface of the lenticular sheet 1 as taught in the prior arts, but joined to the flat surface 220 of the plate 11 of the substrate 2 instead. As used herein, joining can include printing the striped pattern 3 directly to the flat surface 220 of the plate 22, or alternatively, an adhesive (not shown) can be used to apply the striped pattern 3 to the flat surface 220. The lenticular sheet 1 is configured to be parallelly movable with respect to the plate 22 and the striped pattern 3. That is, the striped pattern 3 faces and is spaced apart from the back surface of the lenticular sheet 1 so that the lenticular sheet 1 is slidably upon the plate 22 without touching the striped pattern 3.

As can be seen in FIG. 2, the striped pattern 3 is originally bared and includes a plurality of dense curved lines 31 and a plurality of rare curved lines 32. However, covered with the lenticular sheet 1, as depicted in FIG. 3, the striped pattern 3 is viewed in a first magnified rearranged image based on Snell's law and optical illusion. More specifically, the dense curved lines 31 are transformed from thin left curved lines into a first image with massive left curved lines 31a by the lenticular sheet 1. The rare curved lines 32 are transformed from thin left curved lines into a second image with massive right curved lines 32a. It shall be particularly noted that the rare curved lines 32 are especially configured side by side in a specific pitch such that the rare curved lines 32 can be transformed by the lenticular sheet 1 into a reverse massive image.

Figure 5:
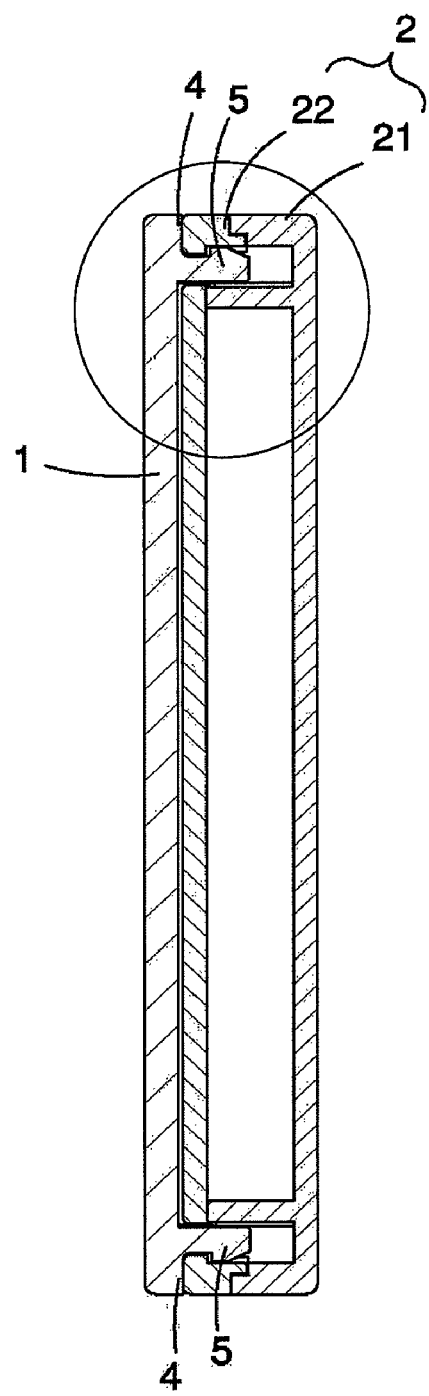
FIG. 5 is a cross-sectional view of the dispenser taken along line B-B in FIG. 3.
Figure 5A:
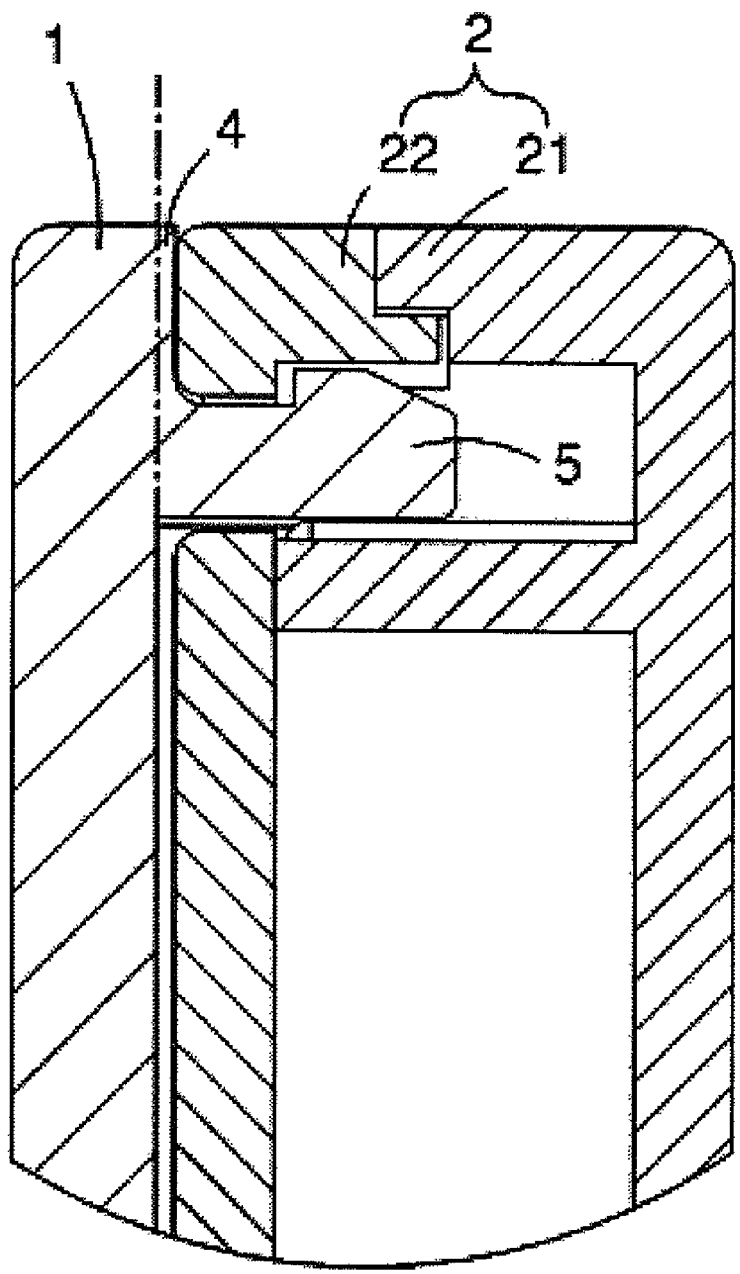
FIG. 5A is an enlarged view of the circled part of FIG. 5.
Figure 6:
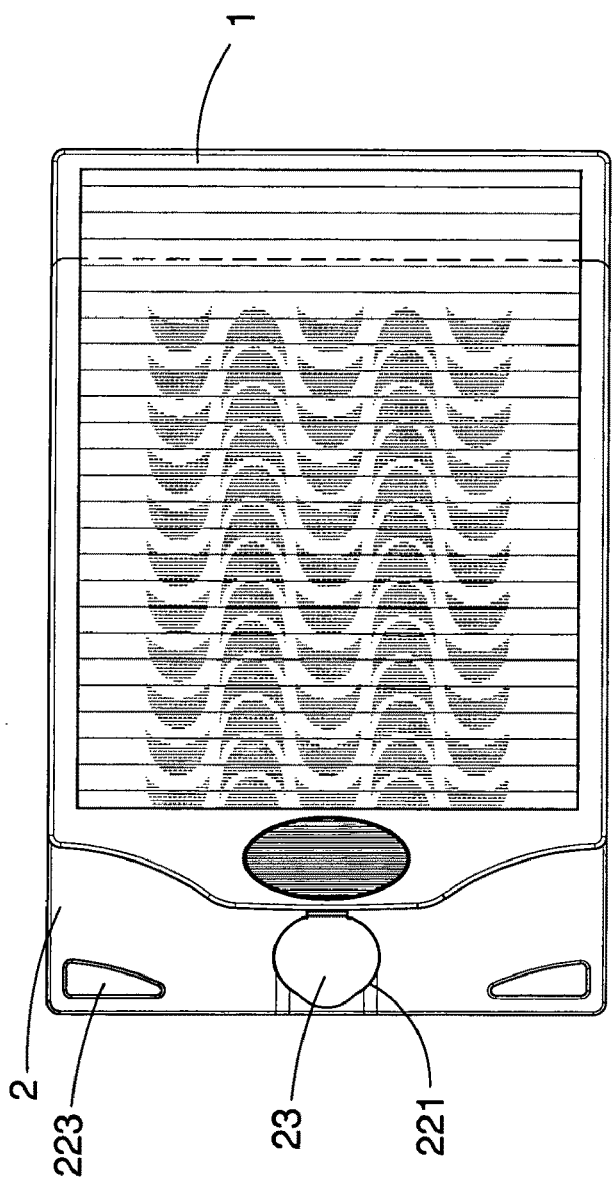
FIG. 6 is a top view of the dispenser of FIG. 3, showing that the lenticular sheet is moved rightward to uncover the opening defined in the substrate.
Figure 7:
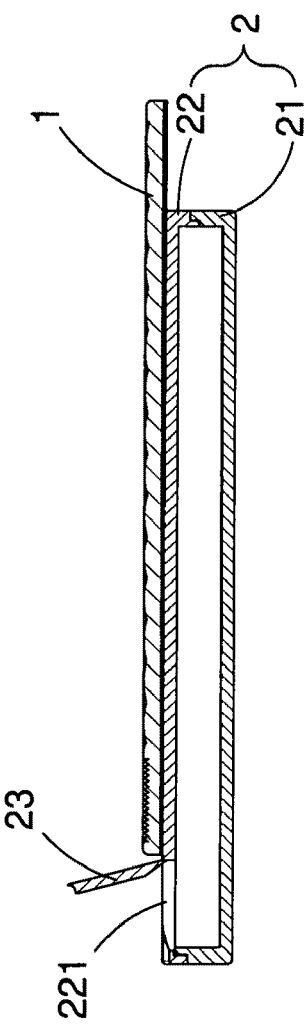
FIG. 7 is a cross-sectional view of FIG. 6.

FIG. 5 is a cross-sectional view of the dispenser 100 taken along line B-B in FIG. 3. Referring to FIG. 5, the dispenser 100 further comprises a plurality of spacers 4 disposed between the lenticular sheet 1 and the plate 22 of the substrate, and at least two hooks 5 each extending from one of the spacers 4. Each spacer 4 extends from a bottom of the lenticular sheet 1 and is held up by the flat surface 220 of the plate 22. Therefore the spacers 4 are sandwiched between the lenticular sheet 1 and the substrate 2 so as to space out the lenticular sheet 1 and the striped pattern 3. The hooks 5 are trapped in the slots 222 respectively. Due to the spacers 4 and hooks 5 underlying the lenticular sheet 1 and supported by the substrate, the lenticular sheet 1 is slidable along the slots 222 of the plate 22 with respect to the striped pattern 3, without touching the striped pattern 3. Further, the lenticular sheet 1 is slidable along the slots 222 to a first position where the opening 221 and the stopper 23 are covered by a front portion of the lenticular sheet 1, as depicted in FIGS. 3 and 4, and to a second position where the stopper 23 is opened and the opening 221 is uncovered as depicted in FIGS. 6 and 7. Accordingly, while the lenticular sheet 1 is moving therebetween to open or close the opening 221 of the substrate 2, the stripped pattern 3 is simultaneously transformed into a second, third, or fourth magnified rearranged image (not shown) continuously. In such a manner, the stripped pattern 3 imparts a vivid dynamic continuous 3D image for the viewer viewing though the lenticular sheet 1.

Comparing with the conventional lenticular image technology by which a pattern or an interlaced precursor image is stuck directly to the lenticular lens, the present invention provides another type of motion illusion. Since the lenticular sheet 1 of the present invention is movable with respect with the striped pattern 3, each lenticule 11 is not limited to display a little piece of the striped pattern 3 but display every piece wherever it moves or scans, which allows a viewer to watch the dynamic continuous 3D image.

Referring now to FIGS. 8-12, a second embodiment of apparatus in a form of another dispenser 200 is shown comprising a lenticular sheet 1a and substrate 2a which are essentially the same as the lenticular sheet 1 and substrate 2 of the first embodiment, in which the lenticular sheet 1 can slide along the slots 222 of the substrate 2 without touching the striped pattern 3. Similarly, the lenticular sheet 1a is slidably upon the substrate 2a without touching the striped pattern 3a in another manner.

Figure 8:
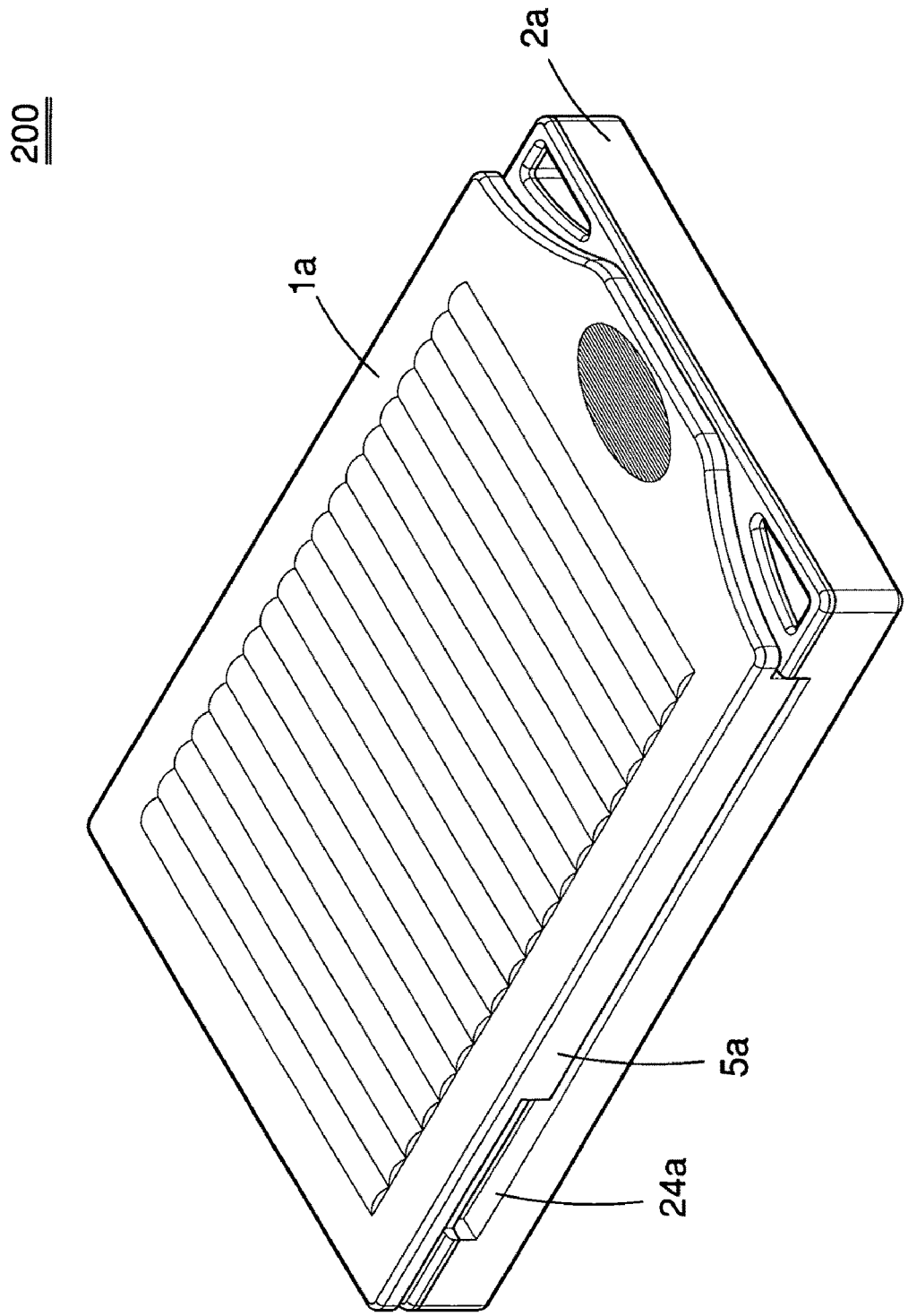
FIG. 8 is a perspective view of an apparatus assembled in a form of another dispenser according to another embodiment of the present invention.
Figure 9:
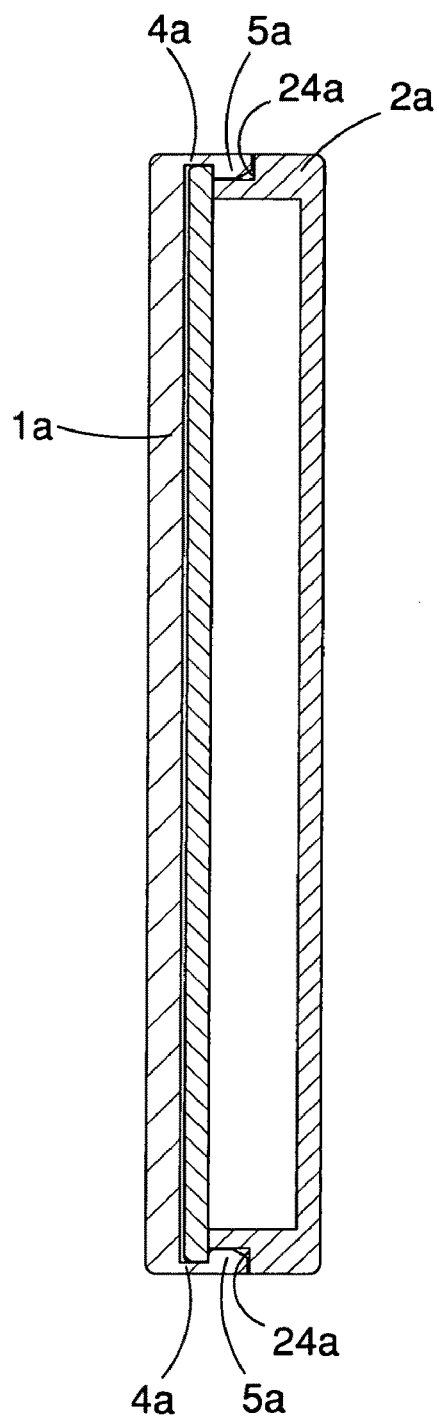
FIG. 9 is a cross-sectional view of FIG. 8.

Referring to FIGS. 8 and 9, the dispenser 200 includes a plurality of spacers 4a and a plurality of hooks 5a each extending from a bottom of one of the spacers 4a. In particular, the substrate 2a has two opposite side surfaces each defining a groove 24a to receive the hooks 5a such that the lenticular sheet 1a is slidable along the grooves 24a without touching the striped pattern 3a.

Figure 10:
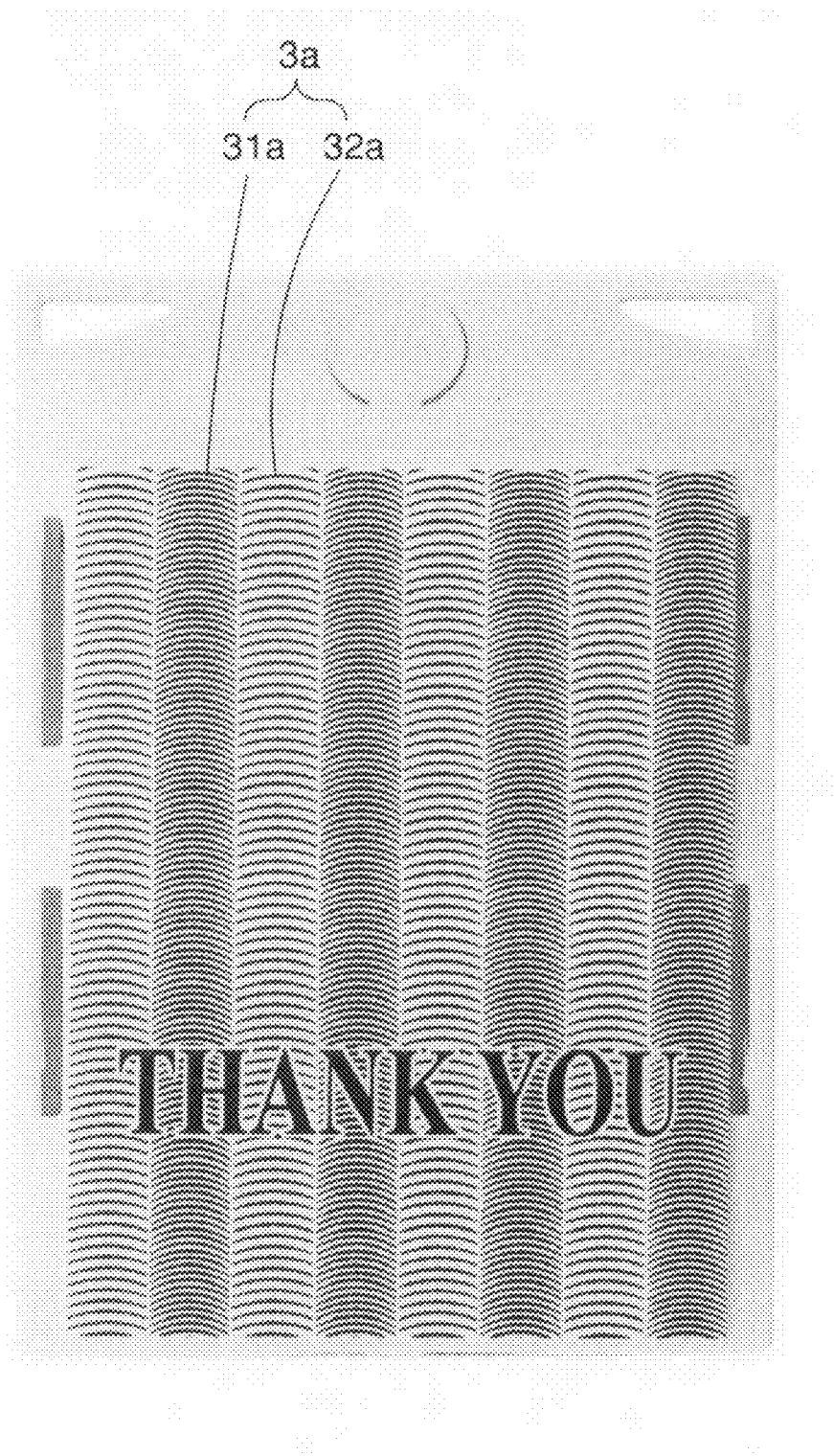
FIG. 10 is a photo of the dispenser in FIG. 8, showing that the striped pattern is exposed.
Figure 11:
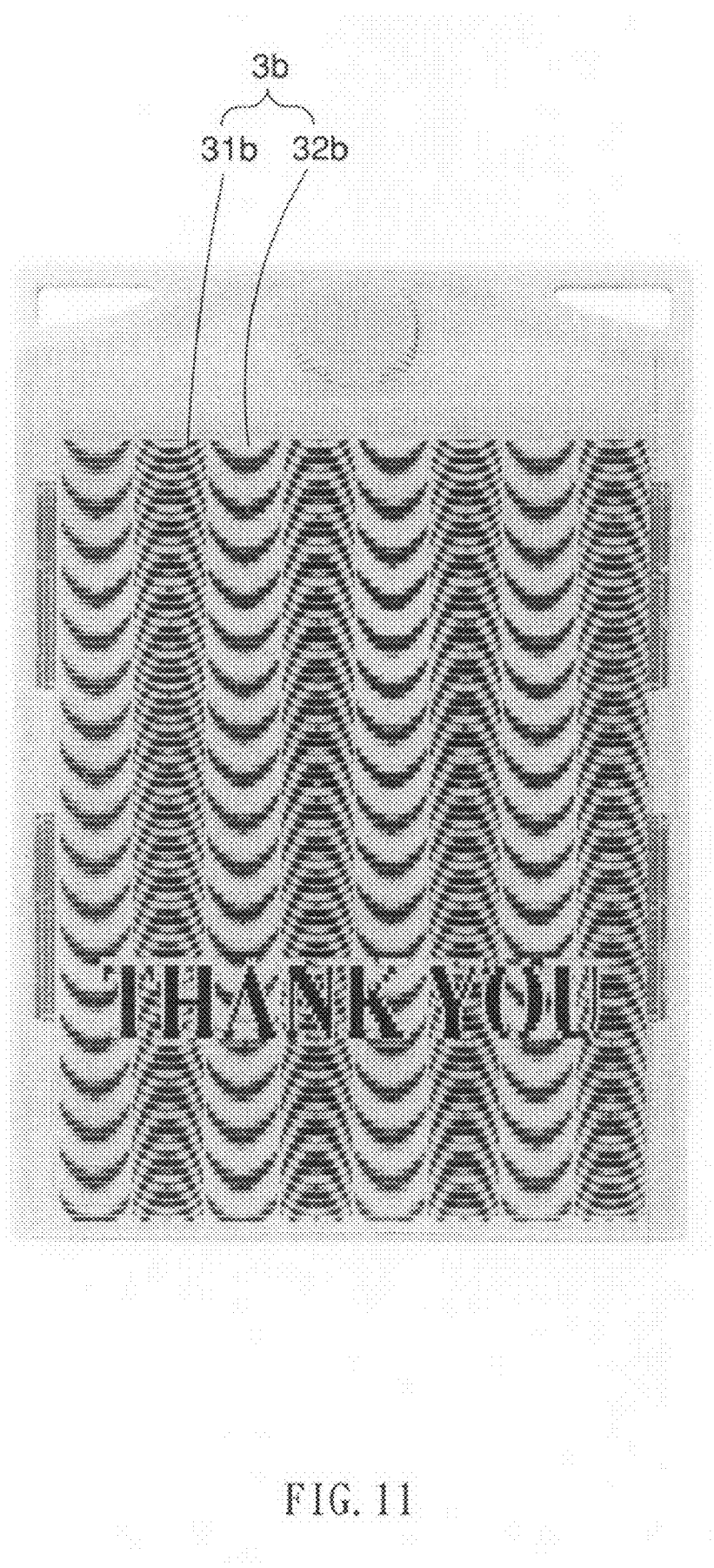
FIG. 11 is a photo of the dispenser in FIG. 8, showing the striped pattern is covered with the lenticular sheet.
Figure 12:
FIG. 12 is a photo of the dispenser in FIG. 11, showing the striped pattern is moved upward to uncover an opening defined in the substrate.

FIGS. 10-12 are photos of the dispenser 200. In FIG. 10, the bared striped pattern 3a is shown with eight rows of dense and rare curved lines thereon, including a dense cur. Covered with the lenticular sheet 1 a, as shown in FIG. 11, the striped pattern 3a with thin curved lines 31a, 32a is transformed into a first enlarger rearranged image 3b with massive curved lines 31b and massive reverse curved lines 32b. In FIG. 12, the lenticular sheet 1a is moved upward to a certain position, the striped pattern 3a is transformed by the lenticular sheet 1a into a last enlarger rearranged image 3c with massive curved lines 31c and massive reverse curved lines 32c. That is, while the lenticular is moving upward along the grooves 24a, the striped pattern 3a is simultaneously transformed into different enlarger rearranged images which impart a vivid dynamic continuous 3D image.

In general, while the present invention has been described in terms of preferred embodiments, it is recognized that equivalents, alternatives, and modifications, aside from those expressly stated, are possible and within the scope of the appending claims.

What is claimed is:

1. An apparatus capable of displaying dynamic continuous images, comprising:
   a substrate having a flat surface;
   a striped pattern applied to the flat surface of the substrate; and
   a lenticular sheet being parallelly movable with respect to the striped pattern; and having a front surface including a plurality of lenticules oriented along an axial direction and a back surface facing the striped pattern;
   wherein the substrate defines a cavity for storing contents therein and an opening in the flat surface; the opening is in communication with the cavity; and the lenticular sheet is movable to a first position to cover the opening of the flat surface and a second position to uncover the opening.

2. The apparatus of claim 1 further comprising a plurality of spacers disposed between the substrate and the back surface of the lenticular sheet to space out the lenticular sheet and the striped pattern.

3. The apparatus of claim 2 wherein the spacers are disposed between the flat surface of the substrate and the back surface of the lenticular sheet.

4. The apparatus of claim 3 further comprising a plurality of hooks, wherein the spacers extends from opposite sides of the back surface of the lenticular sheet and is held up by the substrate; and each of the hooks extends from a bottom of one of the spacers and is trapped in a corresponding one of two parallel slots defined in the flat surface such that the lenticular sheet is slidable along the slots without touching the striped pattern.

5. The apparatus of claim 4 wherein the substrate further comprises a stopper in a shape of the opening to be received in the opening, wherein the stopper is movably secured on a wall of the opening.

6. The apparatus of claim 5 further comprising a through hole defined in a corner of the substrate.

7. The apparatus of claim 2 further comprising a plurality of hooks, wherein the spacers extends from two opposite sides of the lenticular sheet; each of the hooks extends from one of the spacers; and the substrate has two side surfaces each defining a groove to receive the hooks such that the lenticular sheet is slidable along the grooves without touching the striped pattern.

8. The apparatus of claim 7 wherein the substrate further comprises a stopper in a shape of the opening to be received in the opening, wherein the stopper is movably secured on a wall of the opening.

9. The apparatus of claim 8 further defining a through hole at a corner of the substrate.

* * * * *